United States Patent [19]
Tai et al.

[11] Patent Number: 5,668,913
[45] Date of Patent: Sep. 16, 1997

[54] LIGHT EXPANDING SYSTEM FOR PRODUCING A LINEAR OR PLANAR LIGHT BEAM FROM A POINT-LIKE LIGHT SOURCE

[76] Inventors: Ping-Kaung Tai, 3326 Christie Blvd., Toledo, Ohio 43606; Han Zou, 3375 Airport Hwy., Apt. No. 24, Toledo, Ohio 43609

[21] Appl. No.: 583,679

[22] Filed: Jan. 5, 1996

Related U.S. Application Data

[62] Division of Ser. No. 332,262, Oct. 19, 1994, Pat. No. 5,506,929.

[51] Int. Cl.$^6$ ................................................. G02B 6/10
[52] U.S. Cl. ........................... 385/146; 385/901; 362/31
[58] Field of Search ............................. 385/146, 901; 359/599, 707; 362/26, 31, 32, 222, 223, 225, 246, 290, 291, 292, 311, 330, 336, 339, 340

[56] References Cited

U.S. PATENT DOCUMENTS

| | | | |
|---|---|---|---|
| 4,115,994 | 9/1978 | Tomlinson | 58/50 |
| 4,152,756 | 5/1979 | Wrege et al. | 362/291 |
| 4,257,084 | 3/1981 | Reynolds | 362/31 |
| 4,277,817 | 7/1981 | Hehr | 362/31 |
| 4,323,951 | 4/1982 | Pasco | 362/27 |
| 4,390,934 | 6/1983 | Willing | 362/291 |
| 4,528,617 | 7/1985 | Blackington | 362/32 |
| 4,706,173 | 11/1987 | Hamada et al. | 362/341 |
| 4,799,137 | 1/1989 | Aho | 362/309 |
| 4,805,984 | 2/1989 | Cobb, Jr. | 350/96.28 |
| 4,822,145 | 4/1989 | Staelin | 362/31 |
| 4,883,333 | 11/1989 | Yanez | 350/96.1 |
| 4,917,465 | 4/1990 | Conner et al. | 350/335 |
| 4,924,356 | 5/1990 | French et al. | 362/31 |
| 5,040,878 | 8/1991 | Eichenlaub | 362/31 |
| 5,050,946 | 9/1991 | Hathaway et al. | 385/33 |
| 5,136,480 | 8/1992 | Pristash et al. | 362/31 |
| 5,150,966 | 9/1992 | Nelson | 362/336 |
| 5,339,179 | 8/1994 | Rudisill et al. | 362/31 |
| 5,359,691 | 10/1994 | Tai et al. | 385/146 |
| 5,377,084 | 12/1994 | Kojima et al. | 362/31 |
| 5,390,276 | 2/1995 | Tai et al. | 385/146 |
| 5,394,255 | 2/1995 | Yokota et al. | 362/31 |
| 5,485,319 | 1/1996 | Lemons | 362/339 |

FOREIGN PATENT DOCUMENTS

| | | |
|---|---|---|
| 3825436A1 | 3/1989 | Germany. |
| 62-73206 | 4/1987 | Japan. |
| 63-271301 | 11/1988 | Japan. |
| 63-287803 | 11/1988 | Japan. |

OTHER PUBLICATIONS

*Retroreflecting Sheet Polarizer*, by M.F. Weber, SID 92 Digest 427–429; no month 1992.

Primary Examiner—Rodney B. Bovernick
Assistant Examiner—Robert E. Wise
Attorney, Agent, or Firm—Marger, Johnson, McCollom & Stolowitz, P.C.

[57] ABSTRACT

A light expanding system for converting a light beam generated from a point-like light source into a collimated linear or planar light beam is disclosed herein. According to an embodiment of the invention, a system for producing a linear light beam includes a beam collector and a light pipe adjacent to which a multiplicity of specially configured microprisms are located. The light expanding system according to this embodiment is suitable for use in devices utilizing a linear light beam, such as a scanner. According to another embodiment of the invention, a system for producing a planar light beam includes, in addition to the beam collector and light pipe described above, an additional light pipe with adjacent microprisms. The light expanding system according to this embodiment of the invention can be used, for example, in displays, road signs, medical research equipment, instrument meters or jewelry; to light pictures or art work; or as part of a see-through lighting system for use in dentistry and surgery.

10 Claims, 6 Drawing Sheets

LIGHT EXPANDING SYSTEM FOR PRODUCING A LINEAR OR PLANAR LIGHT BEAM FROM A POINT-LIKE LIGHT SOURCE

This application is a divisional of application Ser. No. 08/332,262, filed Oct. 19, 1994, now U.S. Pat. No. 5,506,929.

BACKGROUND OF THE INVENTION

1. Field of the Invention

This invention relates generally to lighting systems and, in particular, to a system for converting light output from a point-like light source into a linear or planar light beam that can be collimated in one or more dimensions to a predetermined degree.

2. Related Art

Light generated by a laser or by accelerating charges to an extremely high speed (such as synchrotron radiation) is naturally collimated in the direction of propagation of the light. On the other hand, light generated by most light sources, such as fluorescent and incandescent lamps, is not naturally collimated in the direction of propagation of the light. However, collimation of incandescent or fluorescent light is often desirable to achieve high energy efficiency in illuminating a given area, or for other purposes such as use in a projection display.

A very small light source (e.g., a light emitting diode) can be treated as a point-like light source (i.e., a light source having very small dimensions, such that the light source can be treated as a point, that gives light in all directions). Previous systems for collimating light generated from a point-like light source have included lenses and parabolic mirrors. Such systems have been widely applied for everyday use in products such as flashlights, and have also been used for scientific applications such as mask aligners employed in making integrated circuits.

While the above-described systems are highly efficient, they are sometimes not suitable for use where a large area must be illuminated with collimated light, especially when the available space is limited. This is because conventional lenses and mirrors are bulky and require an unacceptably large amount of space. For example, the large volume occupied by the lens and mirror systems makes such systems inappropriate for certain applications where compact size is important, such as backlighted LCDs. A compact system that can convert a collimated light beam having a small cross-section to a collimated light beam having a large cross-section is also needed for making light-emitting diodes suitable for applications which need a large area illuminated. As will be seen hereinafter, in accordance with the present invention, a system for collimating light from a point-like light source requires far less space than the conventional lens and mirror systems.

Additionally, systems including lenses, mirrors and a lamp are not transparent and are therefore not suitable for situations in which the lighting system is placed between the viewer and the object to be observed ("frontlighting"). As will be seen hereinafter, in accordance with the present invention, a system for collimating light from a point-like light source can be used for frontlighting.

Furthermore, most lenses and mirrors have a circular cross-section. Thus, the generated light beam also has a circular cross-section. Where it is desired to generate a light beam having other than a circular cross-section (e.g., rectangular cross-section, or narrow strip cross-section such as used in a line scanner), the light beam cannot be efficiently transformed from a circular to non-circular shape. As will be seen hereinafter, in accordance with the present invention, a system for collimating light from a point-like light source enables generation of a non-circular light beam, such as a rectangular light beam, without significant energy loss.

A backlighting system including a light pipe with microprisms that is especially suitable for backlighting LCDs is described in commonly owned, copending U.S. patent application Ser. No. 08/049,509, entitled "Backlighting System with a Multi-Reflection Light Injection System and Using Microprisms," by Tai et al., attorney docket no. B0729-900300, the disclosure of which is incorporated by reference herein. The backlighting system of that application is thin and highly efficient in one-dimensional collimation of a line-like light beam generated from a miniature fluorescent lamp. A transparent frontlighting assembly which uses a light pipe and microprisms is described in commonly owned, copending U.S. patent application Ser. No. 08/255,378, entitled "A Flat and Transparent Front-Lighting System Using Microprisms," by Tai et al., attorney docket no. B0729-900400, the disclosure of which is also incorporated by reference herein. However, the above-described systems do not, for at least some applications, adequately enable conversion of light from a point-like light source to a linear or planar light beam having a sufficiently uniform distribution of light for some applications.

SUMMARY OF THE INVENTION

According to the invention, a light expanding system is used to convert light generated from a point-like light source into, in one embodiment, a linear light beam or, in another embodiment, a planar light beam. The linear or planar light beam can be collimated in one or more dimensions. As compared to conventional lens and mirror collimating systems, the system according to the invention has reduced volume, the capability of being used as a transparent frontlighting system, and the capability of efficiently providing a light beam with a non-circular cross-section.

According to one embodiment of the invention, a system for producing collimated light from a divergent light beam emitted from a point-like light source includes: i) a light pipe having first, second and third surfaces, wherein the first and second surfaces are substantially perpendicular, and the third surface is opposite the second surface; ii) a beam collector positioned between the point-like light source and the first surface of the light pipe for directing light from the point-like light source into the light pipe in a predetermined way; and iii) a plurality of microprisms positioned adjacent to the second surface of the light pipe. Each of the microprisms has a base surface that is adjacent and substantially parallel to the second surface of the light pipe, and a light reflecting surface shaped so that light that enters the light pipe and contacts the light reflecting surface is reflected away from the microprism out of the light pipe through the third surface, the light reflected from the microprism being collimated to a predetermined degree. The system according to this embodiment of the invention produces a linear light beam that can be used in devices that require a long and narrow light beam, such as a scanner.

According to another embodiment of the invention, a system as described immediately above further includes: i) a second light pipe having first, second and third surfaces, wherein the first and second surfaces are substantially perpendicular, the third surface is opposite the second surface, and the second light pipe is positioned so that the first surface of the second light pipe is adjacent to the third surface of the first light pipe; ii) a second plurality of microprisms positioned adjacent to the second surface of the second light pipe. Each of the microprisms includes a base surface that is adjacent and substantially parallel to the second surface of the second light pipe, and a light reflecting surface shaped so that light that enters the second light pipe and contacts the light reflecting surface is reflected away from the microprism out of the second light pipe through the third surface of the second light pipe, the light reflected from the microprism being collimated to a predetermined degree. In a further embodiment, the first surface of the second light pipe can be attached to the third surface of the first light pipe with an adhesive so that the light expanding system can be easily positioned, without need for optical alignment, during assembly of a device using the system according to the invention. The adhesive should have an index of refraction less than the index of refraction of the first light pipe, so that propagation of light within the first light pipe is not affected by the adhesive.

The system according to this embodiment of the invention produces a planar light beam that can be used in devices such as liquid crystal displays (LCDs), automobile meters, road signs, shopping windows, watches, maps, road signs, displays and highlighting pictures, jewelry, and art work. The system can also be used for ultraviolet illumination of objects. If the second light pipe is made transparent, the system can also be used as a see-through lighting system for such applications as dentistry, surgery, and medical and biological inspection tools.

The above-described systems according to the invention can include a second point-like light source positioned at an end of the beam collector opposite the end adjacent to which the first point-like light source is positioned. The point-like light source or sources can produce color or monochrome light. The monochrome light can be converted to color using color filters, if desired. Alternatively, color illumination can be generated by including structure for generating a sequence of color light pulses so that mosaic color filters or a color polarizer are not needed.

In additional embodiments of the invention, a prismatic diffuser can be used to change the propagation direction as well as the divergence angle of the output light beam from a light expanding system according to the invention.

DETAILED DESCRIPTION OF EMBODIMENTS OF THE INVENTION

Throughout the drawings, described below, like elements are designated by the same numeral. Additionally, an x-y-z coordinate system, which maintains the same orientation throughout the drawings, is included within many of the drawings to aid in the discussion of aspects of the invention.

According to the invention, a light expanding system is used to convert light generated from a point-like light source into a linear light beam or a planar light beam, the light beam collimated in one or more planes. Herein, a "point-like light source" is defined as a light source having very small dimensions, such that the light source can be treated as a point, that gives light in all directions. Illustratively, a point-like light source has a characteristic dimension (e.g., diameter) that is on the order of 100 times as small as the characteristic dimension (e.g., display diagonal) of the area to be illuminated. Herein, a "linear light beam" is defined as a light beam having a long and narrow substantially rectangular cross-section such that the magnitude of one dimension of the cross-section is less than approximately 10% of the magnitude of the other dimension of the cross-section. Herein, a "planar light beam" is defined as a light beam that has: i) other than a rectangular cross-section, or ii) a substantially rectangular cross-section such that the magnitude of one dimension of the cross-section is greater than approximately 10% of the magnitude of the other dimension of the cross-section.

Figure 1:
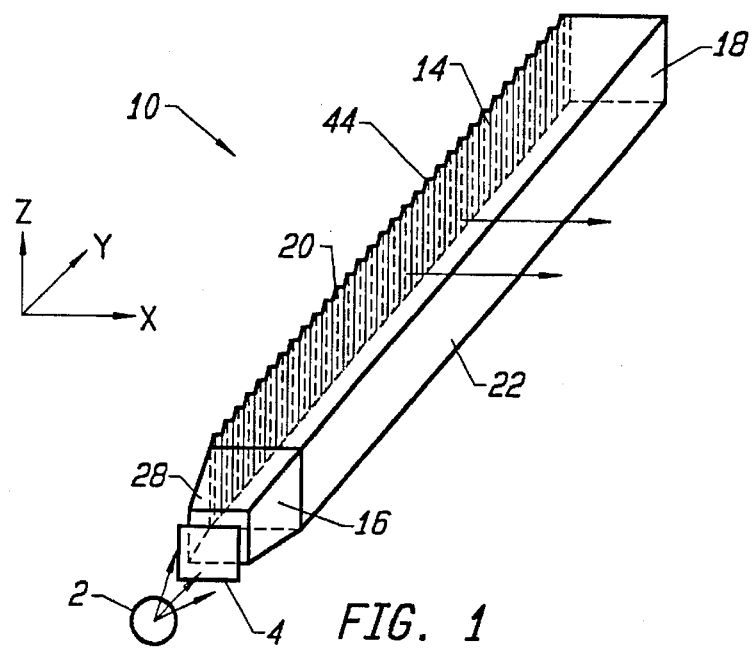
FIG. 1 is a simplified perspective view of a light expanding system according to an embodiment of the invention.

FIG. 1 is a simplified perspective view of a light expanding system 10 according to an embodiment of the invention. The light expanding system 10 includes a beam collector 28 and a beam expanding light pipe 14 to convert divergent light from a point-like light source 2 (shown schematically in FIG. 1 and other figures below) into a linear light beam, the linear light beam being collimated in one or more dimensions.

A filter 4, which can be a color filter or heat filter, is placed between the light source 2 and the light expanding system 10. A heat filter may be needed if the light source generates excessive heat. A color filter is needed if it is desired to produce light having a particular color. The filter 4, however, is not required for the operation of the light expanding system 10 according to the invention.

Divergent light (indicated, in FIG. 1 and the other figures below, by arrows emanating from the light source 2) is emitted by the light source 2. The beam collector 28 directs the divergent light from the light source 2 through an entry surface 16 of the beam expanding light pipe 14. As explained in more detail below with respect to FIG. 2, the beam collector 28 is shaped so that the beam collector 28 also collimates the divergent light in a predetermined manner. However, this need not necessarily be the case, since, for some applications, it may not be necessary for the beam collector 28 to collimate the light. Further, though the beam collector 28 is shown as symmetric about the y-axis, this need not necessarily be the case; the beam collector 28 is not necessarily symmetric about any axis.

A plurality of microprisms 44 are positioned adjacent to a reflecting surface 20 of the beam expanding light pipe 14. The reflecting surface 20 is, in this embodiment, substantially perpendicular to the entry surface 16 of the beam expanding light pipe 14. Light that enters the beam expanding light pipe 14 is directed by the microprisms 44, as explained in more detail below, so that the light exits the beam expanding light pipe 14 at an emission surface 22 that is opposite the reflecting surface 20. The microprisms 44 also collimate the light in a predetermined manner, as also explained in more detail below. Though the beam expanding light pipe 14 is also (excepting the microprisms 44) shown as symmetric about the y-axis, the beam expanding light pipe 14 does not have to be symmetric about any axis.

An end surface 18 of the beam expanding light pipe 14, opposite the entry surface 16, is coated with a light reflecting material that reflects light back towards the entry surface 16. Though the end surface 18 is shown as being substantially parallel to the entry surface 16, the end surface 18 can be angled, i.e., made non-parallel, with respect to the entry surface 16 to reduce or eliminate the leakage of reflected light back through the entry surface 16. Additionally, the emission surface 22 can be angled with respect to the reflecting surface 20 so that the area of the end surface 18 is reduced, thereby reducing light leakage and increasing the efficiency of the light expanding system 10. The length of the beam expanding light pipe 14 (i.e., the distance between the entry surface 16 and the end surface 18) is determined so that the linear beam exiting the beam expanding light pipe 14 has a desired length.

The microprisms 44 can be constructed of any suitable transparent material, such as glass, acrylic or polycarbonate, having the same or approximately the same index of refraction as the beam expanding light pipe 14. The microprisms 44 can be formed separate from and attached to the beam expanding light pipe 14, or the microprisms 44 can be formed integrally with the beam expanding light pipe 14. For example, the microprisms 44 can be made from a sheet of material having a convex prism-featured surface and bonded to the reflecting surface 20 of the beam expanding light pipe 14 with a suitable adhesive, such as acrylate or epoxy, having an appropriate index of refraction such that the adhesive does not deflect the light passing between the beam expanding light pipe 14 and the microprisms 44.

In FIG. 1, the size of the microprisms 44 and the length of the beam expanding light pipe 14 have been exaggerated in order to more fully illustrate the relationship between the microprisms 44 and the beam expanding light pipe 14. Illustratively, the base surface 44c of the microprisms 44 has a width (see FIG. 3A) on the order of one mil. The microprisms 44 also have a height on the order of one mil. The beam expanding light pipe 14 has a length (measured in a direction parallel to the plane of FIG. 3A) on the order of 1–100 inches and a thickness (measured in a direction perpendicular to the plane of FIG. 3A) on the order of 0.1 inches. The beam collector 28 also has a thickness on the order of 0.1 inches. The small thickness of the beam collector 28 and beam expanding light pipe 14 along with the small height of the microprisms 44 enable the light expanding system 10 to be made very small, i.e., have a small thickness. In contrast, previous systems that include a lens and mirror structure typically have a thickness on the order of 1 foot.

Figure 2:
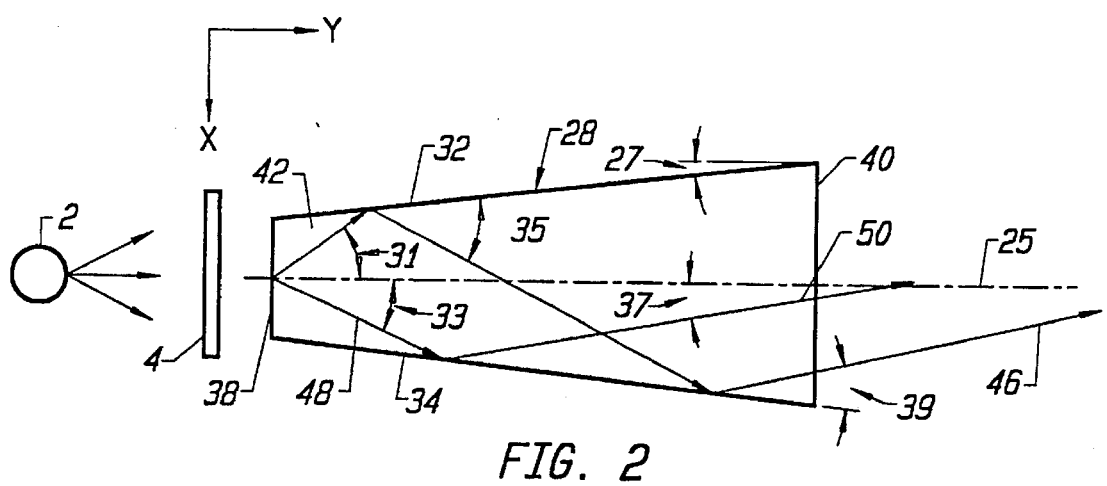
FIG. 2 is a cross-sectional view, taken through a section in the x-y plane, of the beam collector of the light expanding system of FIG. 1.

FIG. 2 is a cross-sectional view, taken through a section in the x-y plane, of the beam collector 28, the filter 4 and the light source 2. The beam collector 28 includes side surfaces 32 and 34, and opposing ends 38 (entry end) and 40 (exit end). As light enters the entry end 38 of the beam collector 28, the light is refracted. The refracted light has a maximum angle of divergence. The magnitude of the maximum angle of divergence is a function of the material of which the beam collector 28 is made. In one embodiment, the beam collector 28 is made of acrylic, which has an index of refraction of 1.49, so that the maximum angle of divergence is approximately 42°.

To collimate light into a desired divergence range, e.g., ±10° in the x-y plane, the side surfaces 32 and 34 are constructed so that the side surfaces 32 and 34 make an angle 27 with a plane that is parallel to the axis of symmetry 25 of the beam collector 28. In one embodiment, the angle 27 is approximately 8°. Light rays passing through the beam collector 28 strike the side surfaces of the beam collector 28, e.g., side surfaces 32 and 34, which, because the side surfaces are angled, results in a reduction in the divergence angle of the light ray.

For example, the light ray 42, which enters the entry end 38 of the beam collector 28 at an angle 31 of 42°, is reflected by side surface 32 and then the opposing side surface 34 of the beam collector 28. With each reflection, the light ray 42 has its divergence angle decreased by 16° (i.e., twice the magnitude of the angle 27). As a result, the light ray 46 leaving the exit end 40 of the beam collector 28 has a divergence angle of 10°, which is within the desired maximum divergence angle of ±10°. Light rays which have a smaller initial divergence angle, such as light ray 48 entering the beam collector at an angle 33 of 20°, are reflected only once (by either surface 32 or surface 34) within the beam collector 28. Thus, the exiting light ray 50 will have an exiting divergence angle 37 that is decreased by 16° from the initial divergence angle 33 of the light ray 46. In addition, light with a divergence angle less than 8° will not hit a surface of the beam collector 28 and will, therefore, propagate through the beam collector 28 with the divergence angle unchanged. With a properly constructed beam collector 28, light rays with any incident angle will be collimated to have a divergence angle less than ±10°. Divergence angle ranges of different magnitudes can be produced by, for example, changing the magnitude of the angle 27.

In FIG. 2, the surfaces 32 and 34 each make an angle 27 with respect to a plane, e.g., plane 25, that is parallel to the average propagation direction of the light within the beam collector 28. In another embodiment, the magnitude of the angle between the surface 32 and such a plane is different than the magnitude of the angle between the surface 34 and such a plane. In general, different surfaces (e.g., surfaces 32 and 34, as well as similar surfaces, not shown, that are perpendicular to the plane of FIG. 2) of a beam collector according to the invention, e.g., beam collector 28, that extend generally in the average propagation direction of the light within the beam collector can make different angles with respect to the axis of symmetry. This may be done, for instance, to achieve a more uniform light distribution. In yet another embodiment of the invention, the side surfaces of the beam collector can have a variable slope along the y-direction to control the divergence angle in a desired manner.

Because the surfaces 32 and 34 are angled so that the distance between the surfaces 32 and 34 and the axis of symmetry 25 of the beam collector 28 gradually increases, the incident angle (measured between a line perpendicular to the surface 32 or 34 and the direction of the light) of light on the surfaces 32 and 34 will be larger than the critical angle (i.e., the angle below which light is refracted through, rather than reflected from, the surface 32 or 34) so that all light contacting the surfaces 32 and 34 is totally internally reflected. Thus, there is no loss in the intensity of the light. Although it is possible to use a conventional reflection surface, such as a plated parabolic mirror, rather than a structure such as beam collector 28 to collimate the light, it is far more efficient to collimate the light by using a reflective surface based on total internal reflection. Additionally, efficiency of light collimation can be increased by shaping the side surfaces of the beam collector 28 to have a curved surface or consist of segments of flat and curved surfaces. Further, although multiple reflection is needed for highly collimated light output, single reflection may be adequate for some applications.

It is to be understood that the divergence angle of light in the y-z plane can also be reduced, in a manner similar to that described above for the x-y plane, by appropriately angling the side surfaces of the beam collector 28 that are perpendicular to the plane of FIG. 2.

For certain types of light-emitting diodes including built-in lenses, the beam collector 28 need not have angled side surfaces, e.g., side surfaces 32 and 34, since the light from the light emitting diode is already adequately collimated. Forming the beam collector 28 without angled side surfaces is desirable since the entry end 38 of the beam collector 28 can be made larger, thus allowing more light to be collected by the beam collector 28 from the light source 2.

Having described the way in which light from the light source 2 is directed by means of the beam collector 28, attention is now directed to the way in which the beam expanding light pipe 14, in cooperation with the microprisms 44, acts on the light exiting the beam collector 28 to provide output light, as shown in FIG. 1. To this end, reference is made to FIG. 3A.

Figure 3A:
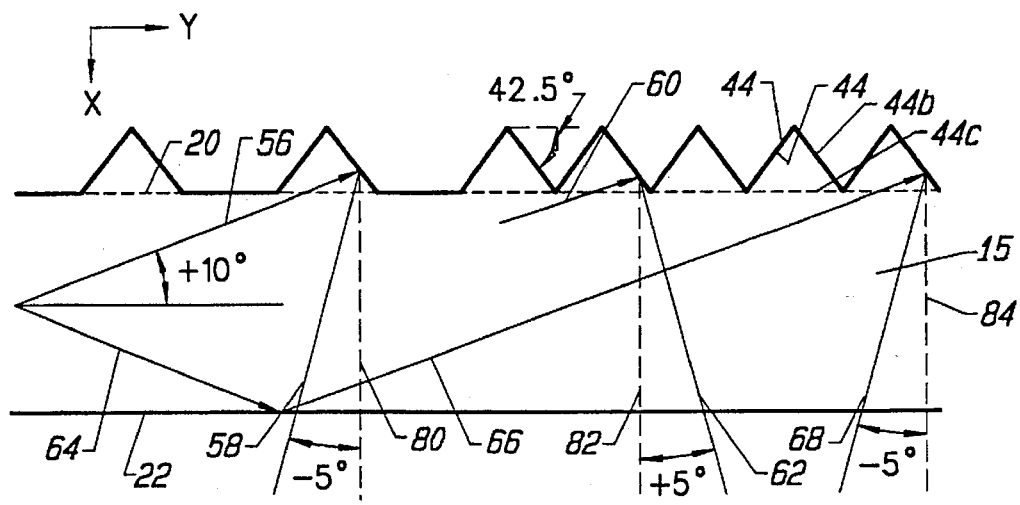
FIG. 3A is a cross-sectional view, taken through a section in the x-y plane, of a portion of the beam expanding light pipe of the light expanding system of FIG. 1, illustrating the way in which light enters and exits the beam expanding light pipe.

FIG. 3A is a cross-sectional view, taken through a section in the x-y plane, of a portion of the beam expanding light pipe 14 of the light expanding system 10 of FIG. 1, illustrating the way in which light enters and exits the beam expanding light pipe 14. For the purpose of this discussion, it will be assumed that the maximum divergence angle at which light enters the beam expanding light pipe 14 is ±10°, as depicted in FIG. 3A. Such a range of divergence angles can be obtained by, for instance, using beam collector 28, as described above with respect to FIG. 2.

In the x-y plane shown in FIG. 3A, each of the microprisms 44 has a triangular cross-section with two light reflecting side surfaces 44a and 44b. Each microprism 44 also has a base surface 44c that is adjacent and substantially parallel to the reflecting surface 20 of the beam expanding light pipe 14. Though the base surfaces 44c of the microprisms 44 are shown in FIG. 3A, in practice, the base surfaces 44c may be indistinguishable from the reflecting surface 20 of the beam expanding light pipe 14 because, for instance, the microprisms 44 are formed integrally with the beam expanding light pipe 14. In the embodiment illustrated in FIG. 3A, each of the side surfaces 44a and 44b makes an angle of 42.5° with the base surface 44c. Each of the side surfaces 44a and 44b may be coated with a reflective material such as aluminum to ensure that all of the light incident on the side surface 44a or 44b will be reflected; however, if the light entering the beam expanding light pipe 14 is sufficiently collimated so that the light strikes the surface 44a or 44b at an angle that produces total internal reflection, as described above, the side surfaces 44a and 44b do not need to be coated. It is to be understood that the present invention is not limited to the above-described physical parameters. For example, the side surfaces 44a and 44b of the microprisms 44 can make other angles with the base surface 44c, and the side surfaces 44a and 44b can be coated with reflective materials other than aluminum. Further, the side surfaces 44a and 44b can be curved rather than planar.

In FIG. 3A, light beams 56 and 62 are shown entering the beam expanding light pipe 14. As described above, every light beam, e.g., light beams 56 and 64 enters the beam expanding light pipe 14 at an angle between −10° and 10° with respect to any plane, e.g., plane 15, that is parallel to the y-z plane (see FIG. 1). Every light beam having a non-zero angle with respect to plane 15 eventually strikes either the reflecting surface 20 or the emission surface 22 of the beam expanding light pipe 14. As a result of reflections from the emission surface 22 and the surface 44b of a microprism 44, each light beam having a non-zero angle is re-directed toward the emission surface 22 such that the re-directed light beam makes an angle of between −5° and 5° with respect to any plane, e.g., planes 80, 82 and 84, perpendicular to the emission surface 22, i.e., the light leaving the beam expanding light pipe 14 through the emission surface 22 is twice as collimated as the light entering through the entry surface 16 of the beam expanding light pipe 14.

For example, the light beam 56, which deviates by 10° from the plane 15, strikes the surface 44b of one of the microprisms 44. The angle of the light beam 56 with respect to the surface 44b is 52.5° (42.5°+10°. The light beam 56 is reflected from the surface 44b because the index of refraction of the microprism 44 is chosen such that light incident at angles less than or equal to this magnitude is reflected. The reflected light beam 58 also makes an angle of 52.5° with respect to the surface 44b so that the light beam 58 makes an angle of −5° with respect to the plane 80.

A light beam 60, which is nearly parallel to the plane 15, strikes the surface 44b of one of the microprisms 44 at an angle of approximately 42.5'. The light beam 60 is reflected from the surface 44b, the reflected light beam 62 also making an angle of approximately 42.5° with the surface 44b so that the light beam 62 makes an angle of +5° with the plane 82.

A light beam 64, which deviates by −10° from the plane 15, strikes the emission surface 22 and is reflected toward the reflecting surface 20. The reflected light beam 66 is directed toward the reflecting surface 20 at an angle of 10° and strikes the surface 44b of one of the microprisms 44 in a manner similar to that of light beam 56. The light beam 66 is reflected from the surface 44b, the reflected light beam 68 making an angle of −5° with respect to the plane 84.

As apparent from the above description, light beams entering the beam expanding light pipe 14 at angles ranging from 10° to approximately zero degrees exit the beam expanding light pipe 14 through the emission surface 22 at angles ranging from −5° to 5°, respectively. Likewise, light beams entering the beam expanding light pipe 14 at angles ranging from −10° to approximately zero degrees exit the beam expanding light pipe 14 through the emission surface 22 at angles ranging from −5° to 5°, respectively. Thus, light exiting the beam expanding light pipe 14 is collimated to have a range of divergence angles that is half the range of divergence angles of the light entering the beam expanding light pipe 14. Note that while light is collimated in the x-y plane, light is not further collimated (beyond the collimation produced by the beam expander 28) in the x-z plane (see FIG. 1) by reflection from the microprisms 44.

If the maximum divergence angle of light entering the beam expanding light pipe 14 is less than or equal to the critical angle of refraction with respect to the surfaces of the microprisms 44, no light can escape the beam expanding light pipe 14 from the reflecting side 20 and no reflective coating is needed on the side surfaces 44a and 44b of the microprisms 44. However, if space is limited and the light can not be collimated with a beam collector, e.g., beam collector 28, to a sufficiently high degree, then the side surfaces 44a and 44b can be coated with a reflective material to ensure that light striking the side surfaces 44a and 44b is reflected toward the emission surface 22 of the beam expanding light pipe 14.

In the embodiment described in conjunction with FIG. 3A, each of the side surfaces 44a and 44b of each microprism 44 makes an angle of 42.5° with the base surface 44c of each microprism 44. Generally, the angle of the side surfaces 44a and 44b should have a magnitude determined by the desired divergence angle and propagation direction of the light exiting the emission surface 22 of the beam expanding light pipe 14, and by the index of refraction of the beam expanding light pipe 14.

In the embodiment shown in FIG. 3A, the microprisms 44 near the entry surface 16 (FIG. 1) of the beam expanding light pipe 14 (i.e., the microprisms at the left of FIG. 3A) are spaced apart from one another. This is done so that relatively more light will be reflected from microprisms 44 distal from the entry surface 16, thereby increasing the light intensity at locations away from the entry surface 16. However, this need not necessarily be the case, and microprisms 44 could be formed so that there are no spaces between adjacent microprisms 44.

As noted above, microprisms having a shape and arrangement different than that of the microprisms 44 can be used with the invention. FIGS. 3B through 3F are cross-sectional views, taken in the same plane as that of FIG. 3A, of a portion of the beam expanding light pipe 14 and microprisms 151, 152, 153 or 154 according to other embodiments of the invention.

Figure 3B:
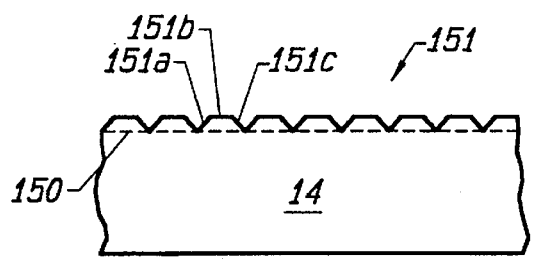
FIG. 3B is a cross-sectional view, taken in the same plane as that of FIG. 3A, of a portion of the beam expanding light pipe and microprisms according to another embodiment of the invention.

In FIG. 3B, each microprism 150 includes three surfaces 151a, 151b and 151c. The surface 151b is substantially parallel to the plane 150 of the surface of the beam expanding light pipe 14 on which the microprisms 151 are formed.

Figure 3E:
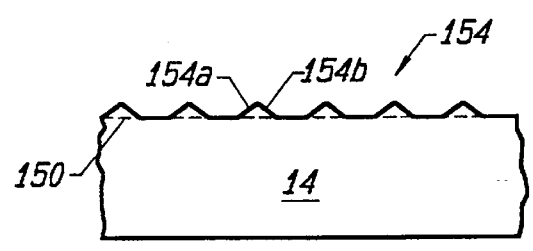
FIG. 3E is a cross-sectional view, taken in the same plane as that of FIG. 3A, of a portion of the beam expanding light pipe and microprisms according to another embodiment of the invention.
Figure 3C:
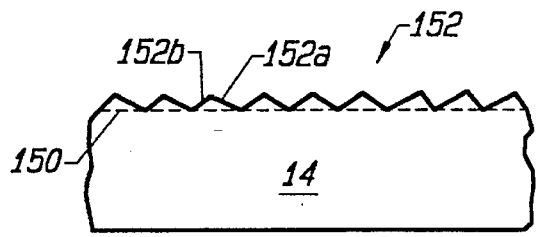
FIG. 3C is a cross-sectional view, taken in the same plane as that of FIG. 3A, of a portion of the beam expanding light pipe and microprisms according to another embodiment of the invention.

In FIG. 3C, each microprism 152 includes surfaces 152a and 152b. The angles that the surfaces 152a and 152b make with the plane 150 vary between microprisms. For example, moving left in FIG. 3C, the angle between the surface 152a and the plane 150 increases for successive microprisms 152. Correspondingly, the angle between the surface 152b and the plane 150 decreases for successive microprisms 152.

Figure 3F:
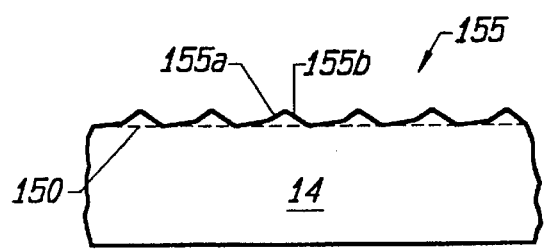
FIG. 3F is a cross-sectional view, taken in the same plane as that of FIG. 3A, of a portion of the beam expanding light pipe and microprisms according to another embodiment of the invention.
Figure 3D:
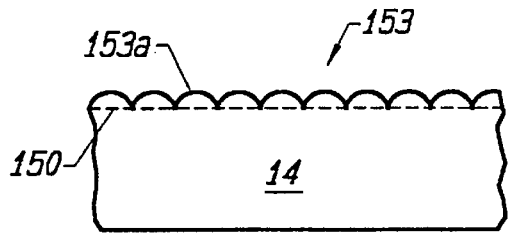
FIG. 3D is a cross-sectional view, taken in the same plane as that of FIG. 3A, of a portion of the beam expanding light pipe and microprisms according to another embodiment of the invention.

In FIG. 3D, each microprism 153 has a curved surface 153a. The curved surface 153a can have any desired arc, e.g., circular, elliptical. Further, though not shown in FIG. 3D, sections of the curved surface 153a can be flattened, e.g., the apex of the curved surface 153a can be flattened to provide a section of the surface that is substantially parallel to the plane 150.

In FIG. 3E, each microprism 154 includes surfaces 154a and 154b angled with respect to the plane 150 to produce a triangular cross-sectional shape, as is the case for the microprisms 44 of FIG. 3A. However, unlike the microprisms 44, the microprisms 154 are separated so that the microprisms 154 are not immediately adjacent to one another.

In FIG. 3F, like the microprisms 154 of FIG. 3E, each microprism 155 includes surfaces 155a and 155b angled with respect to the plane 150 to produce a triangular cross-sectional shape. Also like the microprisms 154, the microprisms 155 are separated so that the microprisms 155 are not immediately adjacent to one another. In contrast to the structure of FIG. 3E, however, in FIG. 3F, the surfaces between microprisms 155 is angled with respect to the plane 150. This can be useful, for instance, in controlling the divergence angle of the light that is emitted from the beam expanding light pipe 14.

Figure 4:
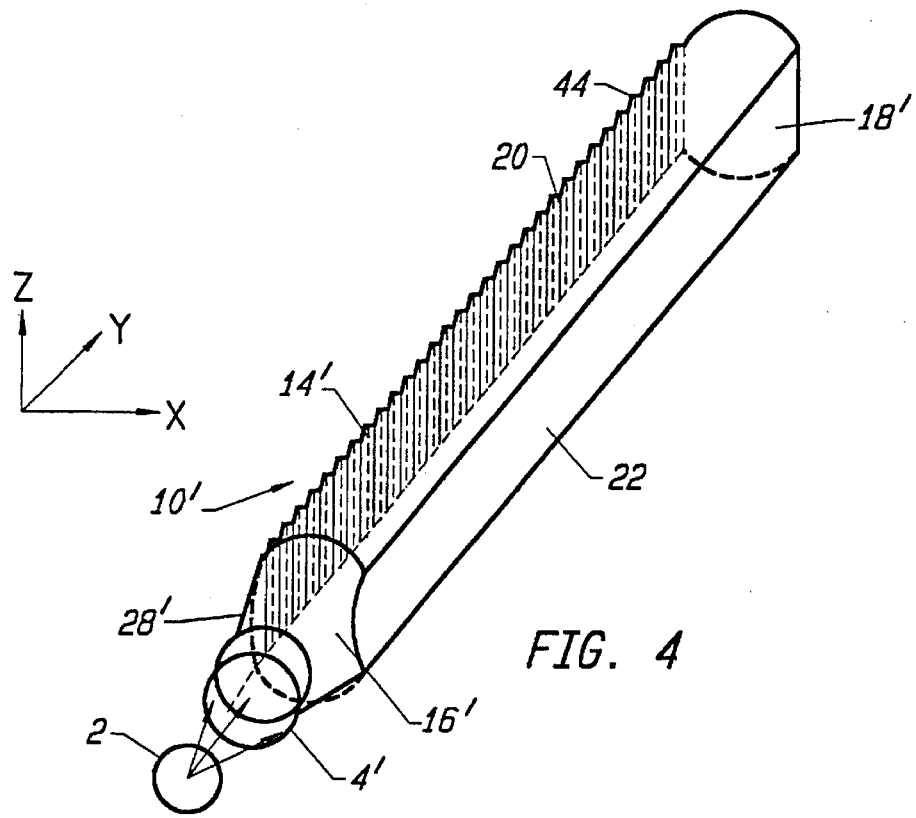
FIG. 4 is a simplified perspective view of a light expanding system according to another embodiment of the invention.

In the embodiments of the invention described above with respect to FIGS. 1 through 3A, the beam collector 28 and the beam expanding light pipe 14 each have a rectangular cross-section in the x-z plane. This need not necessarily be the case; in particular, for a point-like light source such as lamp 2, it may be advantageous for the beam collector 28 to have an elliptical or circular cross-section in the x-z plane in the sections closest to the lamp 2. FIG. 4 is a simplified perspective view of a light expanding system 10' according to such an embodiment of the invention.

In FIG. 4, the light expanding system 10' includes a beam collector 28' and a beam expanding light pipe 14' that each have a generally circular cross-section in the x-z plane. If present, as shown in FIG. 4, a filter 4' also has a circular cross-section. The circular cross-sectional shape of the beam expanding light pipe 14' is truncated at two locations to form opposing flat surfaces 20 (reflecting surface) and 22 (emission surface) that extend along the entire length of the beam expanding light pipe 14'. The beam expanding light pipe 14' also has an entry surface 16' and an end surface 18' that each have a truncated circular cross-sectional shape. In this embodiment, to form flat surfaces that correspond to the flat surfaces of the beam expanding light pipe 14', the cross-sectional shape of the beam collector 28' is also truncated at an end that is adjacent to the entry surface 16' of the beam expanding light pipe 14'. Though, in FIG. 4, the truncated portion of the beam collector 28' does not extend along the entire length of the beam collector 28', in another embodiment, this could be the case.

The light expanding system 10 described above can give highly collimated output light. However, a beam with a somewhat larger divergence angle may be needed. It may not be desirable to accomplish this by increasing the angles of the side surfaces 44a and 44b of the microprisms 44 with respect to the reflecting surface 20 of the beam expanding light pipe 14 because, for instance, this may result in less than total internal reflection, decreasing the efficiency of the light expanding system 10.

Additionally, for certain applications, it is also desirable to have output light propagate from the emission surface 22 of the beam expanding light pipe 14 in a direction that is not normal to the emission surface 22. A prismatic diffuser can be used with the light expanding system 10 to direct the output beam to propagate in a desired direction and/or increase the divergence angle to a desired value.

Figure 5A:
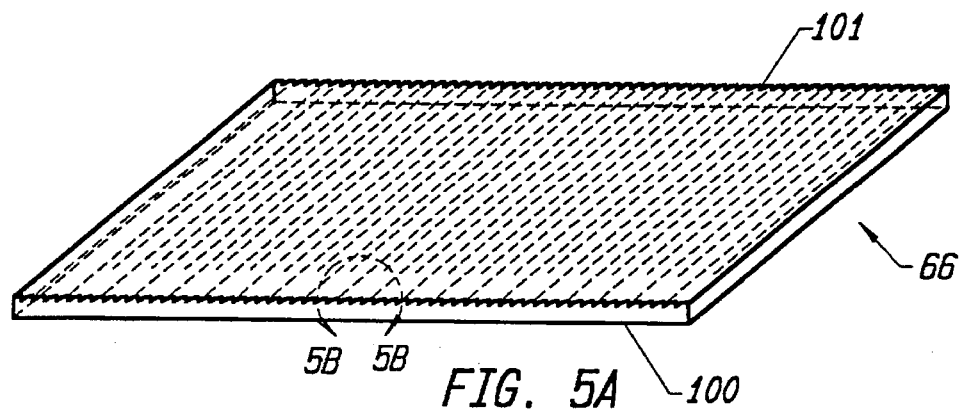
FIG. 5A is a perspective view of a prismatic diffuses for use with a light expanding system according to the invention.

FIG. 5A is a perspective view of a prismatic diffuser 66, for use with a light expanding system according to the invention, that can be used to change the propagation direction and divergence angle of a light beam that is output from the light expanding system. The prismatic diffuser 66 is made of a transparent material such as acrylic or polycarbonate. The prismatic diffuser 66 is formed as a very thin material. For example, typically, the prismatic diffuser 66 has a thickness that is on the order of 10 or more times thinner than the thickness of the beam expanding light pipes, e.g., beam expanding light 14. Also, the prismatic diffuser 66 has a thickness having the same order of magnitude as the pitch (distance between like points of adjacent microprisms) of the microprisms (see FIG. 5B below) formed as part of the prismatic diffuser 66, while the beam expanding light pipe 14 has a thickness that is on the order of 10 to 100 times larger than the pitch of the microprisms 44. The prismatic diffuser 66 has a light input surface 100 and a light output surface 101 opposite the light input surface 100. The light input surface 100 is flat, while the light output surface 101 is shaped to form a prismatic structure. The prismatic diffuser 66 is positioned adjacent the surface from which light is emitted from the light expanding system, e.g., adjacent the emission surface 22 of the beam expanding light pipe 14 of the light expanding system 100, so that light passes through the prismatic diffuser 66 and is refracted, as explained in more detail below with respect to FIG. 5B.

Figure 5B:
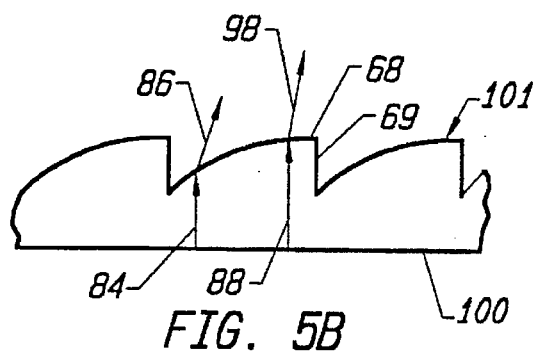
FIG. 5B is a detailed cross-sectional view of a portion of the prismatic diffuser of FIG. 5A.

FIG. 5B is a detailed cross-sectional view of a portion of the prismatic diffuser 66, illustrating the prismatic structure of the light output surface 101. Each of the prisms of the light output surface 101 includes a curved section 68 that opposes the flat surface 100, and a flat section 69 that is substantially perpendicular to the flat surface 100.

Light from a light expanding system, e.g., light expanding system 10, enters the prismatic diffuser 66 at the flat surface 100. Light passes through the prismatic diffuser 66 and exits the curved sections 68 of the prisms of the light output surface 101, the light being refracted by the light output surface 101. Due to the curvature of the curved sections 68, light exiting the prismatic diffuser 66 at different points makes a different angle with respect to the light output surface 101 and is, therefore, refracted by different amounts. For example, the light ray 84 makes a smaller angle with respect to the light output surface 101 than does the light ray 88. Consequently, when light ray 84 exits the prismatic diffuser 66 as light ray 86, it is refracted more than light ray 88 which exits the prismatic diffuser 66 as light ray 69.

As illustrated immediately above, light rays exit the prismatic diffuser 66 with a range of propagation directions. The curved section 68 of the light output surface 101 is shaped so that light rays exiting the light output surface are, in general, re-directed to the right in FIG. 5B. Thus, the propagation direction of the light beam is re-directed to the right in FIG. 5B by the prismatic diffuser 66, the exact propagation direction being determined as the average of the directions of the light rays exiting the prismatic diffuser 66. The variable amount of refraction of light rays passing through the light output surface 101 also causes an increase in the range of propagation directions of the light rays of the light beam, i.e., the divergence angle of the light beam is increased.

As is evident, the shape of prisms of the prismatic diffuser 66 can be tailored to produce any desired change in propagation direction or divergence angle. The prisms can be formed in adjacent rows over the entire light output surface 101, as is shown in FIGS. 5A and 5B, or the prisms can be arranged in any other desired pattern over the light output surface 101. For example, a prismatic structure can be formed with prisms spaced apart from each other, in either one or two dimensions, in a systematic manner. Additionally, a prismatic diffuser for use with the invention can have prismatic structure formed on both the light input and light output surfaces. Such a prismatic diffuser might be useful, for example, in efficiently achieving a large increase in divergence angle or change in propagation direction.

In one embodiment, the prisms of a prismatic diffuser according to the invention are non-symmetrical. In another embodiment of a prismatic diffuser according to the invention, the prisms have at least one surface that is curved. In yet another embodiment, the prisms have at least one surface that is substantially perpendicular to the light input surface 100. In other embodiments, a prismatic diffuser according to the invention can have a combination of one or more of these characteristics.

As described above, some light-emitting diodes with a built-in lens, although small in size, give highly collimated output light. A light collimating prism is not necessary if such a light emitting diode is used as the light source.

Figure 6:
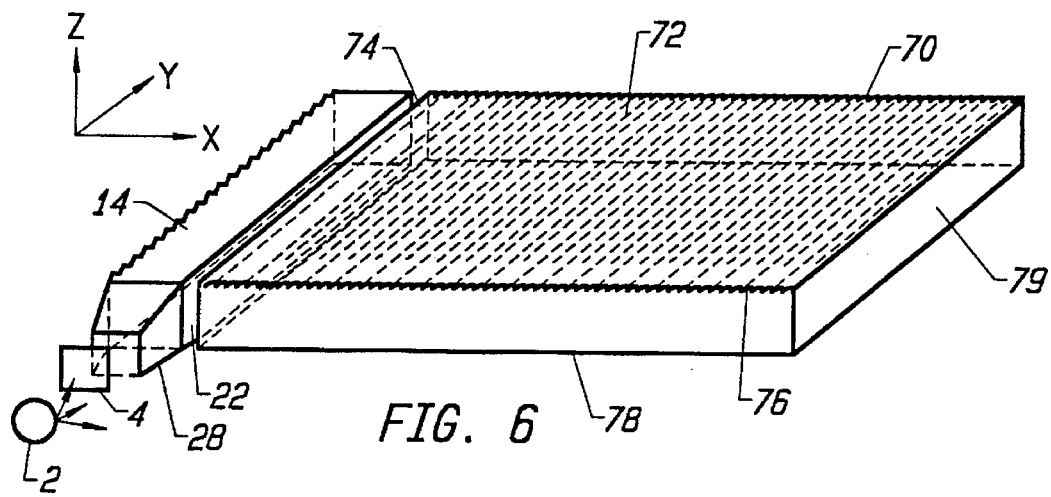
FIG. 6 is a simplified perspective view of a light expanding system according to another embodiment of the invention.

FIG. 6 is a simplified perspective view of a light expanding system 100 according to another embodiment of the invention. The light expanding system 100 includes the beam collector 28, the beam expanding light pipe 14 (first beam expanding light pipe) and a second beam expanding light pipe 70 to convert divergent light from the light source 2 into a planar light beam, the planar light beam being collimated in one or more dimensions. The light expanding system 100 also includes the filter 4 which can, in another embodiment of the invention, be eliminated.

The beam collector 28 and the first beam expanding light pipe 14 operate as described above with respect to FIGS. 1 through 3A. The light that exits the first beam expanding light pipe 14 from the emission surface 22 enters the second beam expanding light pipe 70 through an entry surface 74 of the second beam expanding light pipe 70. In the embodiment shown in FIG. 6, the dimensions of the entry surface 74 are chosen to be at least as large as the corresponding dimensions of the emission surface 22 of the first beam expanding light pipe 14. This is done to avoid light leakage as light passes between the first beam expanding light pipe 14 and the second beam expanding light pipe 70.

A plurality of microprisms 72, similar to the microprisms 44 formed adjacent to the reflecting surface 20 of the first beam expanding light pipe 14 (FIGS. 1 and 3), are positioned adjacent to a reflecting surface 76 of the first beam expanding light pipe 14. The reflecting surface 76 is, in this embodiment, substantially perpendicular to the entry surface 74 of the second beam expanding light pipe 70. The microprisms 72 direct the light so that the light exits the second beam expanding light pipe 70 at an emission surface 78 that is opposite the reflecting surface 76. The microprisms 72 also collimate the light in a predetermined manner. For example, if the microprisms 72 are formed with side surfaces that each make an angle with respect to the reflecting surface 76 of 42.5° (in the same manner that the side surfaces 44a and 44b are angled with respect to reflecting surface 20, as shown in FIG. 3A), the divergence angle, measured in the x-z plane, of the light leaving the emission surface 78 of the second beam expanding light pipe 70 is half the divergence angle of the light entering the second beam expanding light pipe 70 at the entry surface 74.

An end surface 79 of the first beam expanding light pipe 14, opposite the entry surface 74, can be coated with a light reflecting material to reflect light back towards the entry surface 74. Though the end surface 79 is shown as being substantially parallel to the entry surface 74, the end surface 79 can be angled, i.e., made non-parallel, with respect to the entry surface 74 to reduce or eliminate the leakage of reflected light back through the entry surface 74. Additionally, the emission surface 78 can be angled with respect to the reflecting surface 76 so that the area of the end surface 79 is reduced, thereby reducing light leakage and increasing the efficiency of the light expanding system 100. The length of the first beam expanding light pipe 14 (i.e., the distance between the entry surface 16 and the end surface 18, as shown in FIG. 1) and the second beam expanding light pipe 70 (i.e., the distance between the entry surface 74 and the end surface 79) are each determined so that the planar beam exiting the second beam expanding light pipe 70 has desired dimensions.

The microprisms 72 can be constructed of any suitable transparent material such as glass, acrylic or polycarbonate having the same or approximately the same index of refraction as the second beam expanding light pipe 70. The microprisms 72 can be formed separate from and attached to the second beam expanding light pipe 70, or the microprisms 72 can be formed integrally with the second beam expanding light pipe 70. For example, the microprisms 72 can be made from a sheet of material having a convex prism-featured surface and bonded to the reflecting surface 76 of the second beam expanding light pipe 70 with a suitable adhesive, such as acrylate or epoxy, having an appropriate index of refraction such that the adhesive does not deflect the light passing between the second beam expanding light pipe 70 and the microprisms 72.

In another embodiment, a collimating prism, similar to that described above with respect to FIG. 2, is placed between the emission surface 22 of the first beam expanding light pipe 14 and the entry surface 74 of the second beam expanding light pipe 70 to further improve collimation of the light beam in the x-z plane.

Figure 7:
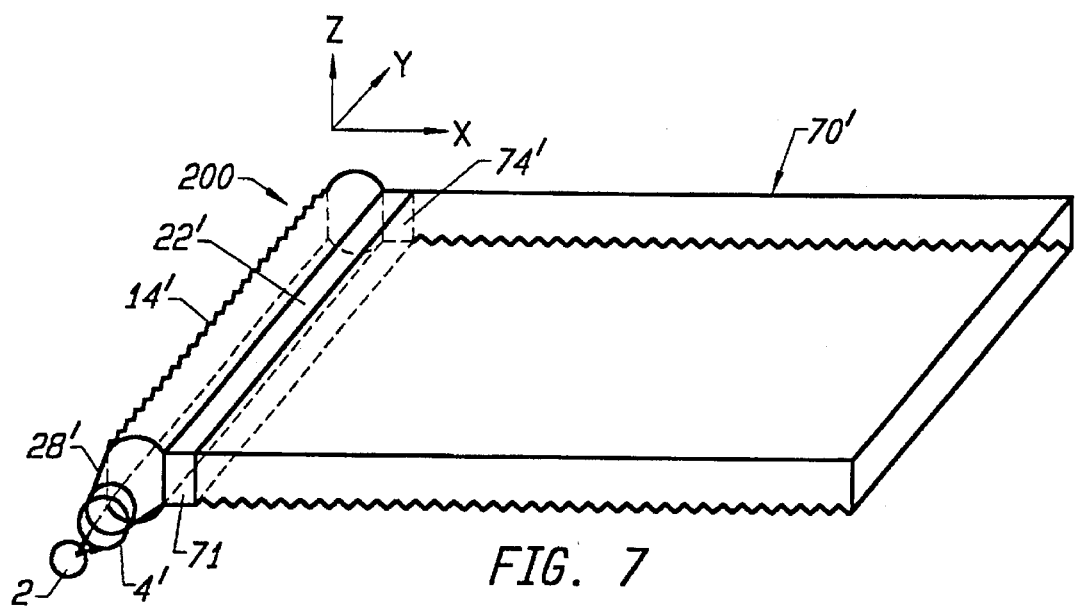
FIG. 7 is a simplified perspective view of a light expanding system according to yet another embodiment of the invention.

FIG. 7 is a simplified perspective view of a light expanding system 200 according to yet another embodiment of the invention. The light expanding system 200 includes a beam collector 28' and beam expanding light pipe 14' (first beam expanding light pipe), as described above with respect to FIG. 4, and a second beam expanding light pipe 70'. The second beam expanding light pipe 70' is similar to the second beam expanding light pipe 70 described above with respect to FIG. 6, differing only in the orientation with respect to the first beam expanding light pipe 14' (first beam expanding light pipe 14 in FIG. 6). Light exiting the second beam expanding light pipe 70' is directed up in the plane of FIG. 7, while light exiting the second beam expanding light pipe 70 is directed down in the plane of FIG. 6.

In the light expanding system 200, a thin layer of laminating adhesive 71 is used to attach the emission surface 22' of the first beam expanding light pipe 14' to the entry surface 74' of the first beam expanding light pipe 70'. The adhesive 71 is made of a material that has a lower index of refraction than the first and second beam expanding light pipes 14' and 70'. Preferably, the index of refraction of the adhesive 71 is made as low as possible. For instance, the adhesive 71 can be made of one type of acrylic-based material having the appropriate index of refraction, and the light pipes 14' and 70' can be made of another material having a higher index of refraction. In one embodiment, the adhesive 71 is made of an acrylic-based material having an index of refraction of 1.455 and the first and second beam expanding light pipes 14' and 70' are made of a material having an index of refraction of 1.49. With these indices of refraction, the critical angle for total internal reflection of light in the first beam expanding light pipe 14' is 77.5°. Since the light inside the first beam expanding light pipe 14' is collimated to have a divergence angle of ±10° with respect to the x-z plane (i.e., an angle of greater than or equal to 80° with respect to the emission surface 22'), as described above with respect to FIG. 3A, light propagates through the emission surface 22' and the adhesive 71 without being affected (i.e., reflected). Thus, optically, the functioning of the light expanding system 200 is not affected by use of the adhesive 71 to attach the first and second beam expanding light pipes 14' and 70'. Use of the adhesive 71 to attach the first beam expanding light pipe 14' to the second beam expanding light pipe 70', eliminates the need to use expensive precision optical alignment equipment to install the light expanding system 100 in a lighting assembly such as a display.

The prismatic diffuser shown in FIGS. 5A and 5B can also be placed on top of the beam expanding light pipe 70' to change the output light propagation direction and increase the divergence angle of the output light beam to a predetermined value.

Figure 8A:
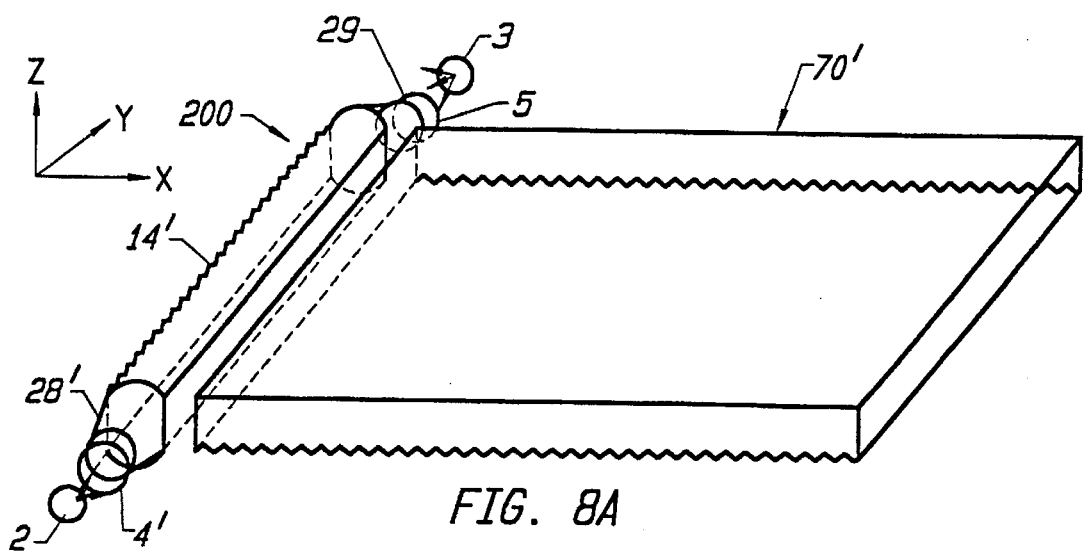
FIG. 8A is a simplified perspective view of the light expanding system of FIG. 7 used with two point-like light sources.
Figure 8B:
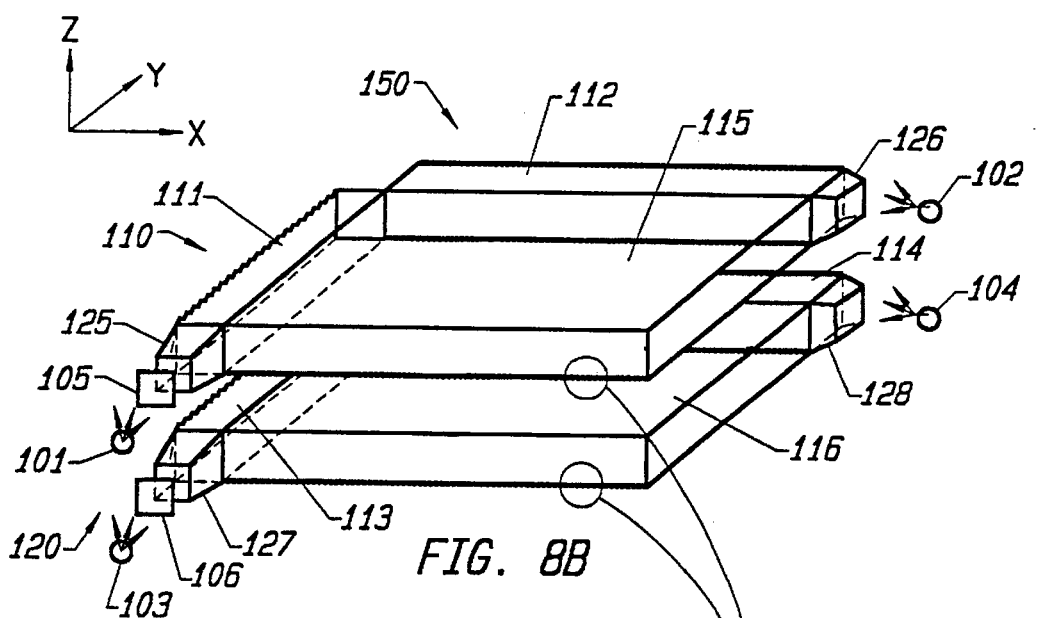
FIG. 8B is a simplified perspective view of a pair of light expanding systems located adjacent to each other, each used with two point-like light sources, according to an embodiment of the invention for producing color light.

FIG. 8A is a simplified perspective view of the light expanding system 200' used with two point-like light sources. Two light sources may be desirable, for instance, to increase the intensity of light produced. In addition to the beam collector 28', first beam expanding light pipe 14' and second beam expanding light pipe 70', the light expanding system 200' includes a second beam collector 29 that is similar to the beam collector 28', The second beam collector 29 is located adjacent to the end surface 18' (FIG. 4) of the first beam expanding light pipe 14'. A second point-like light source 3 emits divergent light that passes through a filter 5 (which is similar to the filter 4, described above with respect to FIG. 1) into the second beam collector 29. The beam collector 29 directs and collimates the divergent light from the light source 3 into the end surface 18' (FIG. 4) of the beam expanding light pipe 14'. In this embodiment, neither the surface 16' (FIG. 4) nor the surface 18' are coated with a reflective material. Light from each light source 2 and 3 is reflected from the microprisms 44 (FIG. 4) adjacent to the reflecting surface 20' into the second beam expanding light pipe 70', as described above. The light is then reflected from the microprisms adjacent to the second beam expanding light pipe 70' so that the light exits the second beam expanding light pipe 70', FIG. 8B is a simplified perspective view of an assembly 150 including a pair of light expanding systems 110 and 120 located adjacent to each other, each used with two point-like light sources, according to an embodiment of the invention for producing colored light. The assembly 150 of FIG. 8B can produce a collimated planar light beam of any primary color or combination of primary colors, including white.

The assembly 150 includes first and second beam expanding light pipes 115 and 116, similar to the beam expanding light pipe 70 of FIG. 6, that are placed adjacent to each other. As explained in more detail below, each of the beam expanding light pipes 115 and 116 is shaped as a rectangular parallelipiped and directs light in the same direction (up in FIG. 8B). Both beam expanding light pipes 115 and 116 are made of a transparent material. Since the beam expanding light pipe 115 is between the beam expanding light pipe 116 and a viewer, the beam expanding light pipe 115 can not have a reflective coating formed on the microprisms 144 (such as may otherwise be useful to ensure that all light is reflected from the beam expanding light pipe 115 toward the viewer). The first beam expanding light pipe 115 is part of the light expanding system 110 and the second beam expanding light pipe 116 is part of the light expanding system 120. Since the light expanding systems 110 and 120 are similar, only the operation of the light expanding system 110 will be described in detail.

Third and fourth beam expanding light pipes 111 and 112 are each positioned adjacent to different ones of the four surfaces of the first beam expanding light pipe 115 that are perpendicular to the surface from which light is emitted from the first beam expanding light pipe 115. The third and fourth beam expanding light pipes 111 and 112 can be positioned adjacent to any two of the four surfaces: one possible configuration is shown in FIG. 8B. Beam collectors 125 and 126 are positioned adjacent to an entry surface of the third and fourth beam expanding light pipes 111 and 112, respectively.

A first point-like light source 101 emits light that passes through a filter 105 into the beam collector 125. The light is collimated by the beam collector 125 and passes into the third light expanding light pipe 111. The light is collimated and redirected out of the third light expanding light pipe 111 into the first light collimating light pipe 115. The light is then collimated and redirected (up in FIG. 8B) out of the first light expanding light pipe 115.

A second point-like light source 102 emits light that passes into a beam collector 126. (Note that, though no filter is present between the light source 102 and the beam collector 126, in another embodiment, the filter could be used.) The light is collimated by the beam collector 126 and passes into the fourth light expanding light pipe 112. The light is collimated and redirected out of the fourth light expanding light pipe 112 into the first light collimating light pipe 115. The light is then collimated and redirected out of the first light expanding light pipe 115.

Each of the beam collectors 125 and 126, and the beam expanding light pipes 111, 112 and 115 of the light expanding system 110 operates in a manner similar to that described above with respect to FIG. 1. The beam collectors 127 and 128, and the beam expanding light pipes 113, 114 and 116 also operate as described above. As explained above, microprisms are used in conjunction with each light pipe to redirect and collimate the light passing through that light pipe.

Figure 8C:
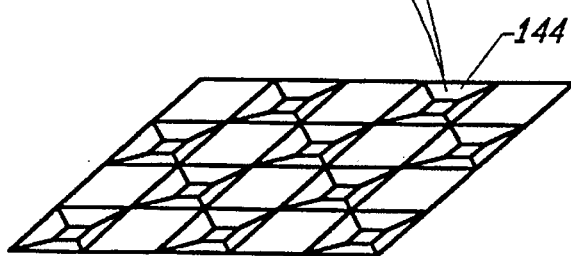
FIG. 8C is a perspective view of a multiplicity of microprisms, according to one embodiment of the invention, used with the beam expanding light pipes of the light expanding system of FIG. 8B.

FIG. 8C is a perspective view of a multiplicity of microprisms 144, according to one embodiment of the invention, used with the beam expanding light pipes 111 through 116 of the light expanding systems 110 and 120. The microprisms 144 are shaped as truncated pyramids having rectangular top and base surfaces, and four rectangular reflecting surfaces, each reflecting surface making an angle with respect to each of the top and bottom surfaces. Though the microprisms 144 are shown in FIG. 8C with space between adjacent microprisms 144, in another embodiment of the invention, the spaces are eliminated so that all of the microprisms 144 are immediately adjacent to one another. The pyramid-shaped microprisms 144 are used with this embodiment of the invention, rather than triangle-shaped microprisms (e.g., microprisms 44 in FIG. 3A), because light from two perpendicular directions must be redirected and collimated, rather than light from a single direction, as is the case for the light expanding systems (e.g., light expanding system 10 in FIG. 1), including the triangle-shaped microprisms. The pyramid-shaped microprisms 144 can also be used with any of the other embodiments of the invention described herein.

Figure 8D:
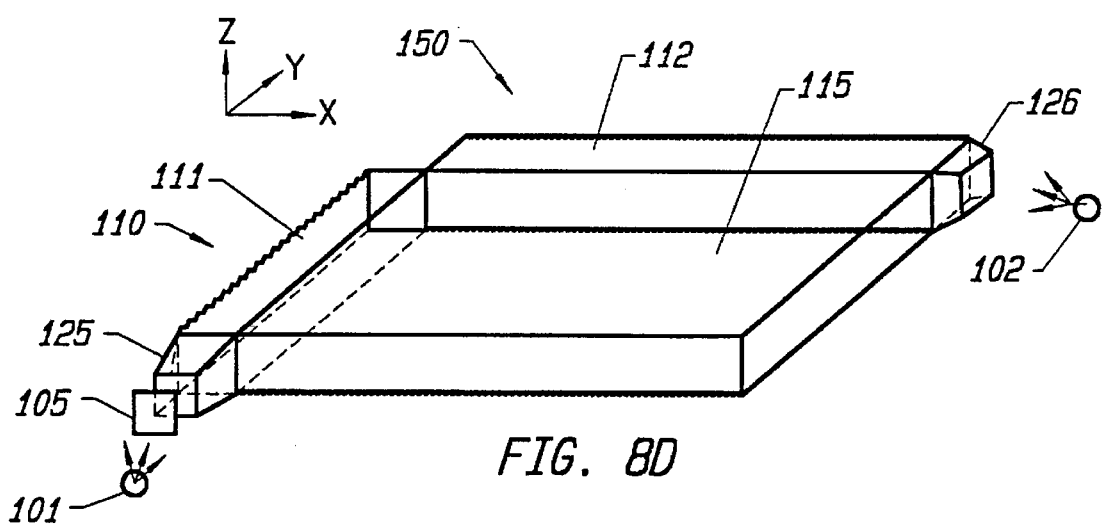
FIG. 8D is a simplified perspective view of a light expanding system according to another embodiment of the invention using two point-like light sources.

In another embodiment of the invention, one of the beam expanding light assemblies 110 or 120 is used alone with the corresponding point-like light sources. FIG. 8D is a simplified perspective view of the light expanding system 110 according to such an embodiment of the invention.

In FIG. 8B, each of the light sources 101 through 104 can produce light of a different color (e.g., red, green, blue, and white), or white light can be passed through a color filter, e.g., filter 105 or 106, to produce a single color of light. Light from the light sources 101 through 104 can be combined in any manner to produce any desired color. For example, light of any primary color can be produced if an appropriate one of the light sources that produces light of one of the primary colors red, green or blue is turned on while all of the other light sources are turned off. With two of the light sources that produce a primary color turned on, cyan, yellow or magenta can be produced. White light can be produced if the light source that produces white light is turned on, or if the three light sources that each produce light of one of the primary colors are all turned on. If all of the light sources are turned on, i.e., red, green, blue and white, strong white light is produced.

Figure 9:
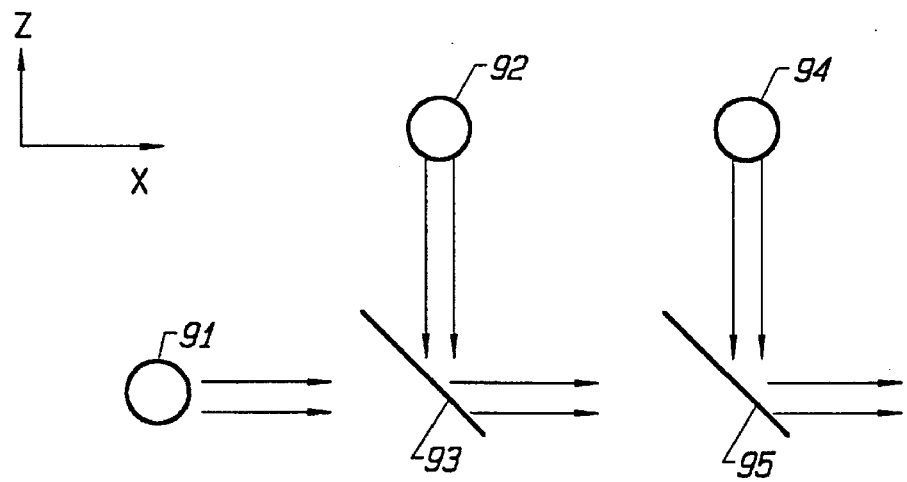
FIG. 9 is a simplified perspective view of a dichroic beam splitter for combining, according to the invention, light beams generated from three point-like light sources.

FIG. 9 is a simplified perspective view of conventional dichroic beam splitters 93 and 95 for use in combining, according to the invention, light beams generated from three point-like light sources 91, 92 and 94. Each of the light sources 91, 92 and 94 produce light of a single color, the color produced by each light source being different from the color produced by the either of the other light sources. Combining light of different colors by using a dichroic beam splitters is useful in, for example, many projector type displays. The dichroic beam splitters, which reflect light of one color while transmitting light of other colors, are positioned in the light propagation path before the light enters a beam expanding light pipe, e.g., beam expanding light pipe 14 (FIG. 1). Light from light sources 92 and 94 impinges on the side of dichroic beam splitters 93 and 95, respectively, and is reflected to travel in the same direction as light from the light source 91. However, the optics associated with dichroic beam splitters require a relatively large space and are therefore not suitable for certain applications where compact size is essential, such as portable displays.

In another embodiment, a set of beam expanding light pipes as illustrated in FIG. 8D is used to produce colored light. In this embodiment, one of the beam expanding light pipes 111 or 112 has a lamp, each lamp producing a different color of light, positioned at each of two opposite ends. The other of the beam expanding light pipes 111 or 112 can have either one or two lamps, each lamp producing a color of light different from any of the other lamps, positioned adjacent to an end or ends of the light pipe. Uniformity of output light and/or energy efficiency may suffer somewhat with this arrangement. Thus, this arrangement can be used for applications which need only limited colors for display, e.g., cyan, red and white.

With an extremely small light source, one may even achieve a color display by placing two or more light sources of different colors directly at or near one end of a beam expanding light pipe such as beam expanding light pipe 111 or 112.

Various embodiments of the invention have been described. The descriptions are intended to be illustrative, not limitative. Thus, it will be apparent to one skilled in the art that certain modifications may be made to the invention as described without departing from the scope of the claims set out below.

We claim:

1. A light expanding system for producing collimated light from a divergent light beam emitted from a point-like light source, comprising:
   a light pipe having first, second and third surfaces, wherein:
      the first and second surfaces are substantially perpendicular; and
      the third surface is opposite the second surface;
   a beam collector positioned between said point-like source and the first surface of said light pipe for directing light from the point-like light source into said light pipe in a predetermined way;
   a prismatic diffuser for one-dimensionally increasing the divergence angle and changing the propagation direction of collimated light positioned between said light pipe and said beam collector, said prismatic diffuser comprising:
      a transparent film; and
      a plurality of microprisms, each microprism further comprising:
         a base surface that is positioned adjacent to surface of the film; and
         a light refracting surface including a plurality of sections, wherein:
            at least one of the sections is curved; and
            viewed in a plane parallel to the direction of light passing through the prismatic diffuser, the light refracting surface is asymmetric.

2. A prismatic diffuser as in claim 1, wherein at least one of the surfaces is substantially perpendicular to the base surface.

3. A light expanding system as recited in claim 1 further comprising:
   a plurality of microprisms is positioned adjacent to the second surface of said light pipe.

4. A light expanding system as recited in claim 3 wherein each microprism comprising:
   a base surface that is adjacent and substantially parallel to the second surface of said light pipe; and
   a light reflecting surface shaped so that light that enters said light pipe and contacts the light reflecting surface is reflected away from the microprism out of said light pipe through the third surface, wherein the reflected light from the microprisms is a light beam different from that produced by a point-like light source and the light beams are collimated to a predetermined degree.

5. A light expanding system as recited in claim 1 wherein said beam collector comprises:
   a first surface and a second surface opposite the first surface and wherein the cross-sectional area of the beam collector, measured in planes parallel to the first and second surfaces of the beam collector, increases in a direction from the first surface of the beam collector to the second surface of the beam collector, such that the maximum angle at which the light enters said light pipe is limited.

6. A method for providing a light expanding system for producing collimated light from a divergent light beam emitted from a point-like light source, comprising the steps of:
   providing a light pipe having first, second and third surfaces, wherein:
      the first and second surfaces are substantially perpendicular; and
      the third surface is opposite the second surface;
   providing a beam collector positioned between said point-like source and the first surface of said light pipe for directing light from the point-like light source into said light pipe in a predetermined way;
   providing a prismatic diffuser for one-dimensionally increasing the divergence angle and changing the propagation direction of collimated light positioned between said light pipe and said beam collector, said prismatic diffuser comprising:
      a transparent film; and
      a plurality of microprisms, each microprism further comprising:
         a base surface that is positioned adjacent to surface of the film; and
         a light refracting surface including a plurality of sections, wherein:
            at least one of the sections is curved; and
            viewed in a plane parallel to the direction of light passing through the prismatic diffuser, the light refracting surface is asymmetric.

7. A method as recited in claim 6 wherein in providing said prismatic diffuser, said method further comprises the step of providing at least one of the surfaces so that it is substantially perpendicular to the base surface.

8. A method as recited in claim 6 wherein in providing said light expanding system, said method further comprises the step of:
   providing a plurality of microprisms is positioned adjacent to the second surface of said light pipe.

9. A method as recited in claim 8 wherein in said step of providing a plurality of microprisms, said method further comprises the steps of:
   providing a base surface so that it is adjacent and substantially parallel to the second surface of said light pipe; and
   providing a light reflecting surface shaped so that light that enters said light pipe and contacts the light reflecting surface is reflected away from the microprism out of said light pipe through the third surface, wherein the reflected light from the microprisms is a light beam different from that produced by a point-like light source and the light beams are collimated to a predetermined degree.

10. A method as recited in claim 6 further comprising the step of:
   providing that said beam collector comprises a first surface and a second surface opposite the first surface and wherein the cross-sectional area of said beam collector, measured in planes parallel to the first and second surfaces of the beam collector, increases in a direction from the first surface of the beam collector to the second surface of the beam collector, such that the maximum angle at which the light enters said light pipe is limited.

* * * * *